(12) United States Patent
Zhuo et al.

(10) Patent No.: US 11,099,740 B2
(45) Date of Patent: Aug. 24, 2021

(54) METHOD, APPARATUS AND COMPUTER PROGRAM PRODUCT FOR MANAGING STORAGE DEVICE

(71) Applicant: EMC IP Holding Company LLC, Hopkinton, MA (US)

(72) Inventors: Baote Zhuo, Beijing (CN); Jian Gao, Beijing (CN); Jibing Dong, Beijing (CN); Jianbin Kang, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 47 days.

(21) Appl. No.: 16/574,851

(22) Filed: Sep. 18, 2019

(65) Prior Publication Data

US 2020/0133506 A1 Apr. 30, 2020

(30) Foreign Application Priority Data

Oct. 30, 2018 (CN) .......................... 201811280462.8

(51) Int. Cl.
*G06F 3/06* (2006.01)
*G06F 9/50* (2006.01)

(52) U.S. Cl.
CPC .......... *G06F 3/0611* (2013.01); *G06F 3/0659* (2013.01); *G06F 3/0689* (2013.01); *G06F 9/5011* (2013.01); *G06F 2206/1012* (2013.01)

(58) Field of Classification Search
CPC .... G06F 3/0611; G06F 3/0659; G06F 3/0689; G06F 9/5011; G06F 2206/1012

USPC ......................................... 711/112, 114, 154
See application file for complete search history.

(56) References Cited

U.S. PATENT DOCUMENTS

| | | | |
|---|---|---|---|
| 6,625,750 B1 | 9/2003 | Duso et al. | |
| 7,134,138 B2 | 11/2006 | Scherr | |
| 7,356,643 B2* | 4/2008 | Allison | G06F 3/0613 711/100 |
| 8,601,553 B1 | 12/2013 | Griffin et al. | |
| 8,620,882 B2 | 12/2013 | Griffin et al. | |
| 2003/0101316 A1* | 5/2003 | Krishnamurthy | G06F 9/5011 711/114 |
| 2011/0145449 A1* | 6/2011 | Merchant | G06F 9/5011 710/40 |
| 2015/0161043 A1* | 6/2015 | Tsuchiyama | G06F 3/0653 711/102 |

* cited by examiner

*Primary Examiner* — Gary J Portka
(74) *Attorney, Agent, or Firm* — BainwoodHuang

(57) ABSTRACT

Techniques manage a storage device. Such techniques involve: in response to receiving an I/O request for a storage device comprising a plurality of disks, determining, from the plurality of disks, at least one disk related to the I/O request; allocating, to each of the at least one disk, at least one access credit for completing the I/O request from total access credits of the disk, wherein the total access credits are associated with at least one of a type of the disk, a type of the I/O request and performance of the disk; and in response to respective access credits being allocated to the at least one disk, performing access requested by the I/O request to each of the at least one disk. Such techniques can effectively improve the overall access performance of the storage device.

25 Claims, 6 Drawing Sheets

METHOD, APPARATUS AND COMPUTER PROGRAM PRODUCT FOR MANAGING STORAGE DEVICE

CROSS-REFERENCE TO RELATED APPLICATION

This application claims priority to Chinese Patent Application No. CN201811280462.8, on file at the China National Intellectual Property Administration (CNIPA), having a filing date of Oct. 30, 2018, and having "METHOD, APPARATUS AND COMPUTER PROGRAM PRODUCT FOR MANAGING STORAGE DEVICE" as a title, the contents and teachings of which are herein incorporated by reference in their entirety.

FIELD

Embodiments of the present disclosure generally relate to the field of data storage, and more specifically, to a method, an apparatus and a computer program product for managing a storage device.

BACKGROUND

A storage system usually includes a plurality of disks and the plurality of disks can be organized into a storage device, such as a Redundant Array of Independent Disks (RAID). The RAID can be allocated with predetermined access credits. As used herein, "access credits" here refer to a number of read requests and/or write requests which can be processed by the RAID simultaneously. In addition, each disk can be allocated with respective access credits to prevent overload of this disk.

In traditional solutions, each of the plurality of disks may be allocated with identical access credits. Read requests and write requests for each disk often share the access credits allocated to the disk. However, different disks may differ in types, and different types of disks usually have distinct performance. Therefore, resources of disks with high performance will be wasted if identical access credits are allocated to different types of disks. Besides, a response time of a read request is often shorter than that of a write request. Therefore, if the read request and the write request share the access credits allocated to the disk, the merit of the short response time of the read request cannot be fully utilized. In addition, the access credits allocated to each disk usually cannot vary with changes of disk performance (e.g., performance degradation due to increasing wear) in the traditional solutions. Hence, the access performance of the entire RAID will be affected when the access performance of one disk in the RAID reduces.

SUMMARY

Embodiments of the present disclosure provide a method, an apparatus and a computer program product for managing a storage device (or data storage system).

In a first aspect of the present disclosure, there is provided a method for managing a storage device. The method includes: in response to receiving an I/O request for a storage device including a plurality of disks, determining, from the plurality of disks, at least one disk related to the I/O request; allocating, to each of the at least one disk, at least one access credit for completing the I/O request from total access credits of the disk, wherein the total access credits are associated with at least one of a type of the disk, a type of the I/O request and performance of the disk; and in response to respective access credits being allocated to the at least one disk, performing access requested by the I/O request to each of the at least one disk.

In a second aspect of the present disclosure, there is provided an apparatus for managing a storage device. The apparatus includes at least one processing unit and at least one memory. The at least one memory is coupled to the at least one processing unit and stores instructions for execution by at least one processing unit. The instructions, when executed by the at least one processing unit, cause the apparatus to perform actions including: in response to receiving an I/O request for a storage device including a plurality of disks, determining, from the plurality of disks, at least one disk related to the I/O request; allocating, to each of the at least one disk, at least one access credit for completing the I/O request from total access credits of the disk, wherein the total access credits are associated with at least one of a type of the disk, a type of the I/O request and performance of the disk; and in response to respective access credits being allocated to the at least one disk, performing access requested by the I/O request to each of the at least one disk.

In a third aspect of the present disclosure, there is provided a computer program product tangibly stored in a non-transitory computer storage medium and including machine-executable instructions. The machine-executable instructions, when executed by the device, cause the device to perform any steps of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

In each drawing, same or corresponding reference signs represent same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more details with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

Figure 1:
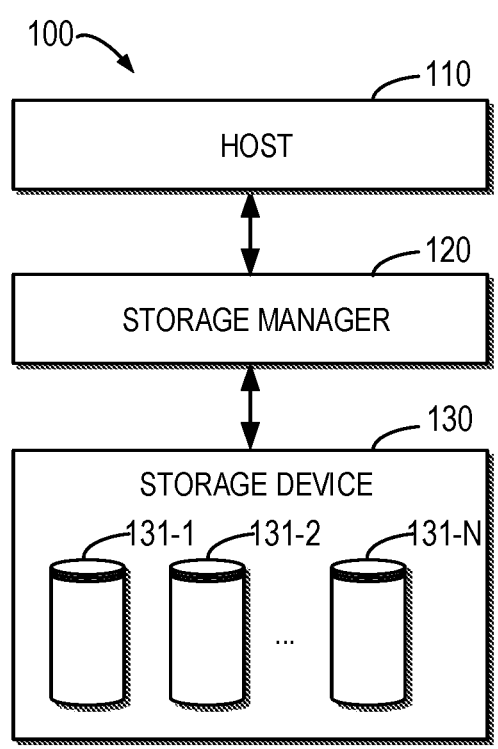
FIG. 1 illustrates a schematic diagram of an example environment where embodiments of the present disclosure can be implemented.

FIG. 1 illustrates a block diagram of an example environment 100 where embodiments of the present disclosure can be implemented. As shown in FIG. 1, the environment 100 includes a host 110, a storage manager 120 and a storage device 130. It is to be understood that the structure of the environment 100 is described only for the purpose of illustration, without suggesting any limitation to the scope of the present disclosure. For example, embodiments of the present disclosure also can be applied to an environment different from the environment 100.

In the environment 100, the host 110, for example, can be any physical computer, virtual machine and server that operates a user application. The host 110 can transmit to the storage manager 120 an Input/output (I/O) request, e.g., for reading data from the storage device 130 and/or writing data into the storage device 130. In response to receiving a read request from the host 110, the storage manager 120 can read data from the storage device 130 and return the read data to the host 110. In response to receiving a write request from the host 110, the storage manager 120 can write data into the storage device 130.

As shown in FIG. 1, the storage device 130 can include a plurality of disks 131-1, 131-2 . . . 131-N (collectively or individually known as "disk 131"). The "disk" as used herein may refer to any non-volatile storage medium currently known or to be developed in the future, such as a magnetic disk, optical disk, or solid state disk (SSD). In the following, a RAID built with a plurality of disks will be taken as an example of the storage device 130. However, it is to be understood that this is only for the purpose of description without suggesting any limitation to the scope of the present disclosure. Embodiments of the present disclosure are also applicable to other storage devices.

As described above, identical access credits are usually allocated to each of a plurality of disks included in the storage device in a traditional solution. Read requests and write requests for each disk often share the access credits allocated to the disk. However, different disks may differ in types, and different types of disks usually have distinct performance. Therefore, resources of disks with high performance will be wasted if identical access credits are allocated to different types of disks. Besides, a response time of a read request is often shorter than that of a write request. Therefore, if the read request and the write request share the access credits allocated to the disk, the merit of the short response time of the read request cannot be fully utilized. In addition, the access credits allocated to each disk usually cannot vary with changes of disk performance (e.g., performance degradation due to increasing wear) in the traditional solutions. Hence, the performance of the entire storage device will be affected when the performance of one disk in the entire storage device reduces.

Embodiments of the present disclosure provide a solution for managing a storage device, so as to solve one or more of the above problems and other potential problems. This solution allocates different access credits to different types of disks, so as to make full use of the resources of the disks with high performance. Moreover, the solution separates the read access credits from the write access credits for the same disk, so as to take full advantage of the short completion time of the read access. The solution also can dynamically adjust the access credits of the disk based on the response time of the disk for an input/output request, so as to adapt to performance degradation due to disk wear and balance differences among different disks of the same type due to different manufacturers. In this way, this solution can effectively improve the overall access performance of the storage device.

Figure 2:
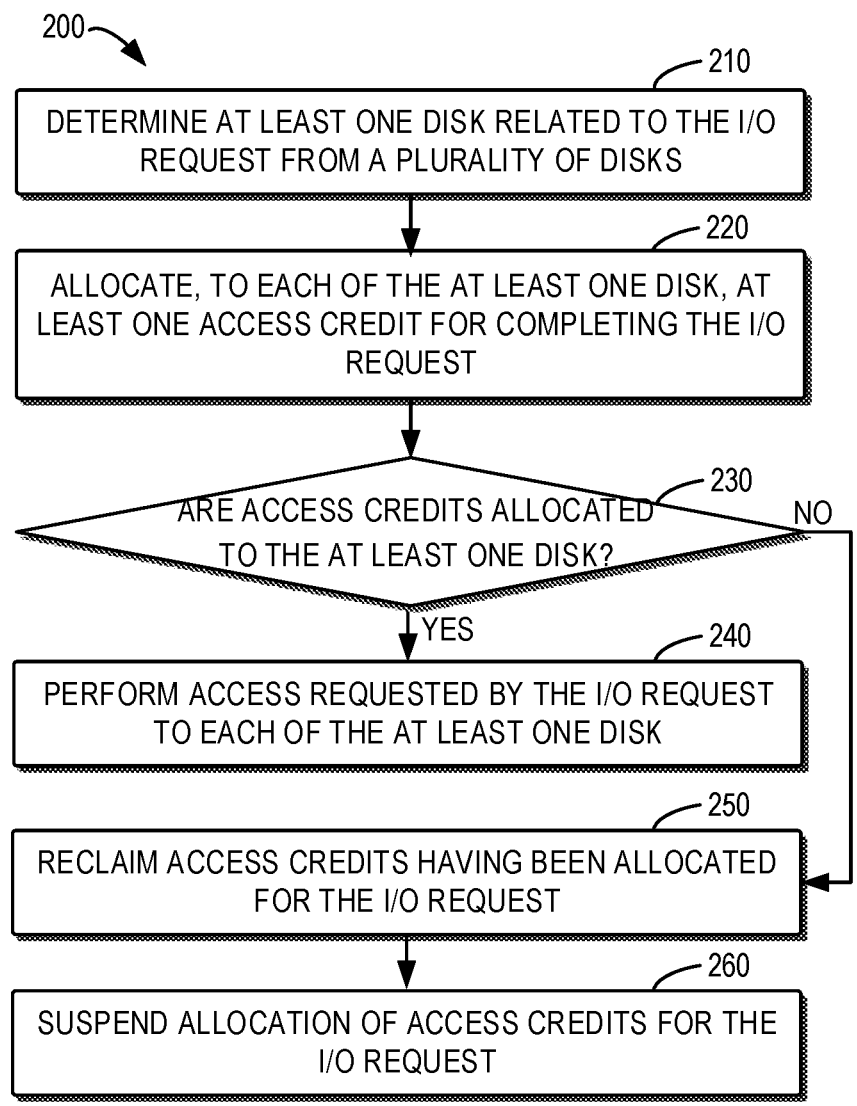
FIG. 2 illustrates a flowchart of an example method for managing a storage device in accordance with embodiments of the present disclosure.

FIG. 2 illustrates a flowchart of a method 200 for managing a storage device in accordance with embodiments of the present disclosure. The method 200, for example, can be executed by the storage manager 120 shown in FIG. 2. It is to be understood that the method 200 also can include additional actions not shown and/or omit the illustrated actions and the scope of the present disclosure is not limited in this regard. The method 200 will be described in details below with reference to FIG. 1.

At block 210, in response to receiving, from the host 110, an I/O request for a storage device 130 including a plurality of disks 131, the storage manager 120 determines at least one disk 131 related to the I/O request from the plurality of disks 131.

In some embodiments, every disk 131 in the storage device 130 shown in FIG. 1 can be divided into a group of continuous and non-overlapping extents of fixed size. A plurality of extents of the plurality of storage disks 131 can be organized into a mapped RAID. Besides the mapped RAID, it is to be understood that one or more disks 131 in the storage device 130 also can be used for constructing a traditional RAID (i.e., a RAID constructed with storage disks instead of the extents in the storage disks), and the scope of the present disclosure is not limited in this regard.

Figure 3:
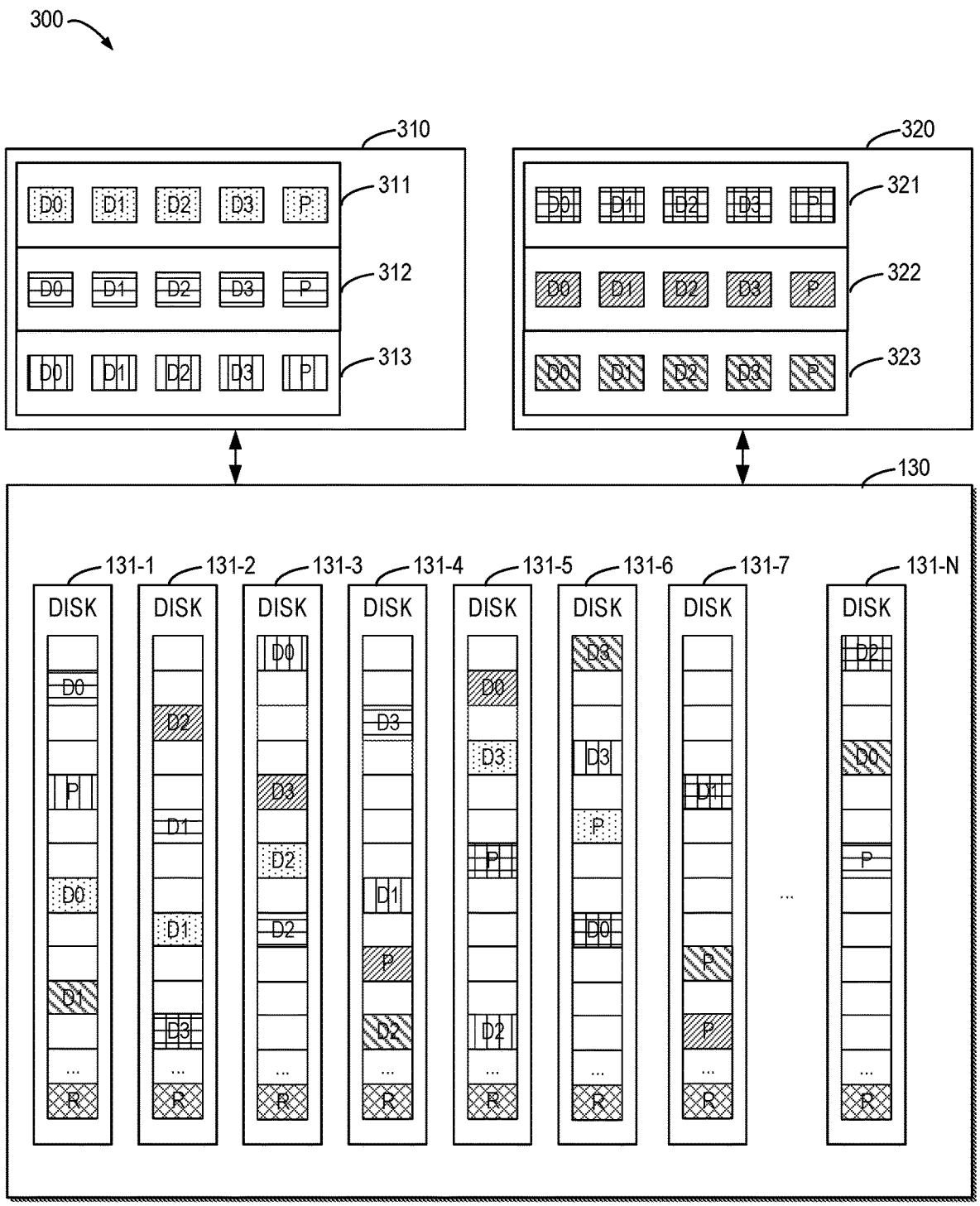
FIG. 3 illustrates a schematic diagram of an example mapped RAID in accordance with embodiments of the present disclosure.

FIG. 3 illustrates a schematic diagram of an example mapped RAID 300 in accordance with embodiments of the present disclosure, which graphically demonstrates an example of the mapped RAID constructed based on the plurality of disks 131 shown in FIG. 1. As shown in FIG. 3, for example, the RAID 5 with a 4D+1P layout may be constructed base on the N disks 131~131-N, where N is greater than 5. In the example shown by FIG. 3, D0~D3 each represent a data extent for storing user data and P represents a parity extent for storing parity information. When one RAID stripe (including D0~D3 and P) is created, five extents can be randomly selected from five different disks. Therefore, the user data and the parity information can be evenly distributed over all the disks. For example, in the example of FIG. 3, a RAID group 310 and a RAID group 320 are created on the disks 131, where the RAID group 310 may include RAID stripes 211, 212 and 213 and the RAID group 320 may include RAID stripes 221, 222 and 223. Additionally, in order to guarantee the reliability of the mapped RAID, some spare extents, which are represented by R for example, are reserved on the disks 131. When a certain one of the disks 131 fails, the spare extents can be used for rebuilding a RAID stripe associated with the failure, so as to avoid data loss.

In some embodiments, the I/O request for the storage device 130 can be an I/O request directed against a certain RAID stripe (e.g., RAID stripe 311, 312, 313, 321, 322 or 323) shown in FIG. 3. For example, the storage manager 120 can maintain a mapping relationship between the RAID stripe and the disks 131, and determine one or more disks 131 related to the I/O request based on the mapping relationship. The request for the RAID stripe 311, for example, may be directed to the disks 131-1, 131-2, 131-3, 131-5 and 131-6. The request for the RAID stripe 321, for example, will may be directed to the disks 131-6, 131-7, 131-N, 131-2 an 131-5.

Return to FIG. 2, at block 220, the storage manager 120 allocates, to each of the at least one disk 131, at least one access credit for completing the I/O request from total access credits of the disk. In some embodiments, the total access credits can be associated with at least one of the disk type, the I/O request type and the disk performance.

In some embodiments, different types of disks may have different initial access credits. Besides, for each disk, the initial access credits for read requests and those for write requests may be different. In some embodiments, in order to control the total number of read requests and write requests sent to a disk, hybrid access credits also can be configured for the disk to restrict the total number of read requests and write requests simultaneously sent to the disk.

Table 1 demonstrates a list of respective performance of six different types of disks, where TOPS represents I/O throughput per second. The type of disk described herein can be divided based on disk interface, wear resistance level, performance and the like. For example, the first type can be a mechanical disk with a serial SCSI (i.e., SAS) interface and a serial ATA (i.e., SATA) chuck body, which is also referred to as a SAS-NL disk. The second type can be a mechanical disk with a SAS interface and a SAS chuck body, which is also referred to as a SAS disk. The third type to sixth type can be flash disks with different wear resistance levels. It is to be understood that the numeric values in Table 1 are illustrated only for the purpose of examples, without suggesting any limitation to the scope of the present disclosure.

TABLE 1

Performance of Different Types of Disks

| Disk type | Sequential Read Bandwidth (MB/s) | Sequential Write Bandwidth (MB/s) | Random Read IOPS | Random Write IOPS |
|---|---|---|---|---|
| First Type | 90 | 80 | 255 | 230 |
| Second Type | 190 | 175 | 456 | 512 |
| Third Type | 1095 | 665 | 128K | 97K |
| Fourth Type | 1180 | 690 | 131K | 69K |
| Fifth Type | 1400 | 1150 | 128K | 109K |
| Sixth Type | 1600 | 1350 | 190K | 80K |

It can be seen from Table 1 that respective performance of the six different types of disks generally meets the following relationship: the first type<the second type<the third type<the fourth type<the fifth type<the sixth type. Table 2 illustrates initial numbers of read access credits R, write access credits W and hybrid access credits T allocated for the above six types of disks in accordance with embodiments of the present disclosure. As used herein, the read access credits of a disk here can indicate the maximum number of read requests which can be processed by the disk simultaneously; the write access credits of the disk can indicate the maximum number of write requests which can be processed by the disk simultaneously, and the hybrid access credits of the disk can indicate the maximum total number of the read requests and the write requests which can be processed by this disk simultaneously. In some embodiments, the number of the read access credits R, the number of the write access credits W and the number of the hybrid access credits T of the same disk satisfy the following relationship: $T \in [\min(R, W), \max(R, W)]$. For the purpose of simplification, the initial number of the hybrid access credit of each type of disks may be set to be a larger one between the initial number of the read access credits and the initial number of the write access credits in Table 2. It is to be understood that the numeric values in Table 2 are illustrated only for the purpose of examples, without suggesting any limitation to the scope of the present disclosure.

TABLE 2

Initial Access Credits of Different Types of Disks

| Disk type | Hybrid Access Credits | Read Access Credits | Write Access Credits |
|---|---|---|---|
| First Type | 40 | 40 | 36 |
| Second Type | 60 | 60 | 54 |
| Third Type | 200 | 200 | 160 |
| Fourth Type | 220 | 220 | 176 |
| Fifth Type | 260 | 260 | 208 |
| Sixty Type | 280 | 280 | 224 |

By allocating different access credits for different types of disks, embodiments of the present disclosure can make full use of the resources of the disks with high performance. Besides, embodiments of the present disclosure can make full use of the advantage that the read access has a short completion time by separating the read access credits from the write access credits for the same disk.

Figure 4:
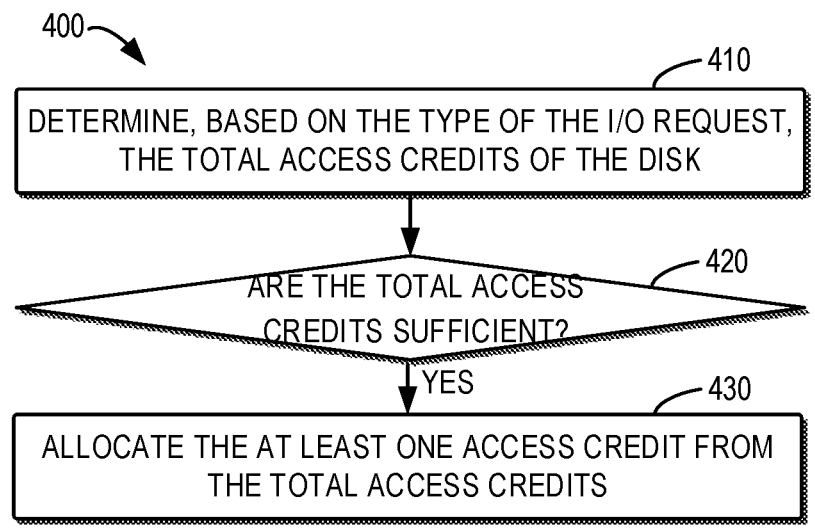
FIG. 4 illustrates a flowchart of an example method for allocating access credits to a disk for completing the I/O request in accordance with embodiments of the present disclosure.

FIG. 4 illustrates a flowchart of a method 400 for allocating access credits to a disk for completing the I/O request in accordance with embodiments of the present disclosure. The method 400, for example, can act as an example implementation of the block 220 as shown in FIG. 2. It is to be understood that the method 400 also can include additional actions not shown and/or omit the illustrated actions. The scope of the present disclosure is not limited in this regard.

At block 410, the total access credits of the disk are determined based on the type of the I/O request. In some embodiments, in response to the I/O request being a read request, the total access credits of the disk can be determined as the read access credits and/or the hybrid access credits. Alternatively, in response to the I/O request being a write request, the total access credit of the disk can be determined as the write access credits and/or the hybrid access credits.

At block 420, whether the total access credits of the disk are sufficient for completing the I/O request is determined. In some embodiments, for a read request, if both the number of the hybrid access credits and the number of the read access credits of the disk exceed a predetermined threshold (e.g., 0), it may indicate that there are sufficient access credits to complete the read request. If one of the above two numbers is below or equal to the predetermined threshold, it may indicate that there are not sufficient access credits to complete the read request. Similarly, for a write request, if both the number of the hybrid access credits and the number of the write access credits of the disk exceed a predetermined threshold (e.g., 0), it may indicate that there are sufficient access credits to complete the write request. If one of the above two numbers is below or equal to the predetermined threshold, it may indicate that there are not sufficient access credits to complete the write request.

If it is determined that the total access credits of the disk are sufficient to complete the I/O request, at least one access credit from the total access credits can be allocated for completing the I/O request at block 403. For example, regarding the read request, each of the number of the hybrid access credits and the number of the read access credits of the disk can be decremented. Regarding the write request, each of the number of the hybrid access credits and the number of the write access credits of the disk can be decremented. If it is determined that the total access credits of the disk are insufficient to complete the I/O request, at least one access credit cannot be allocated to the disk for completing the I/O request.

Return to FIG. 2, at block 230, the storage manager 120 determines whether respective access credits are successfully allocated to the at least one disk. If the at least one access credit is successfully allocated to each of the at least one disk, at block 240, the storage manager 120 may perform access requested by the I/O request to each of the at least one disk. For example, taking the RAID stripe 321 shown in FIG. 3 as an example, the storage manager 120 may access the disks 131-6, 131-7, 131-N, 131-2 and 131-5 respectively. Taking the RAID stripe 311 shown in FIG. 3 as an example, the storage manager 120 may access the disks 131-1, 131-2, 131-3, 131-5 and 131-6 respectively.

If the at least one access credit cannot be allocated to a certain disk in the at least one disk for completing the I/O request (i.e., it is determined, at block 420 in FIG. 4, that the total access credits of the disk are insufficient to complete the I/O request), at block 250, the storage manager 120 may reclaim the access credits which have already been allocated to other disks in the at least one disk for the I/O request. For example, regarding the read request, the storage manager 120 may reclaim the access credits for the disk by incrementing the number of the hybrid access credits and the number of the read access credits for the disk. Regarding the read request, the storage manager 120 may reclaim the access credits for the disk by incrementing the number of the hybrid access credits and the number of the write access credits for the disk.

At block 260, the storage manager 120 may further add the I/O request to a waiting queue to suspend allocation of access credits for the I/O request until an access credit allocated for a previous I/O request is reclaimed.

Figure 5:
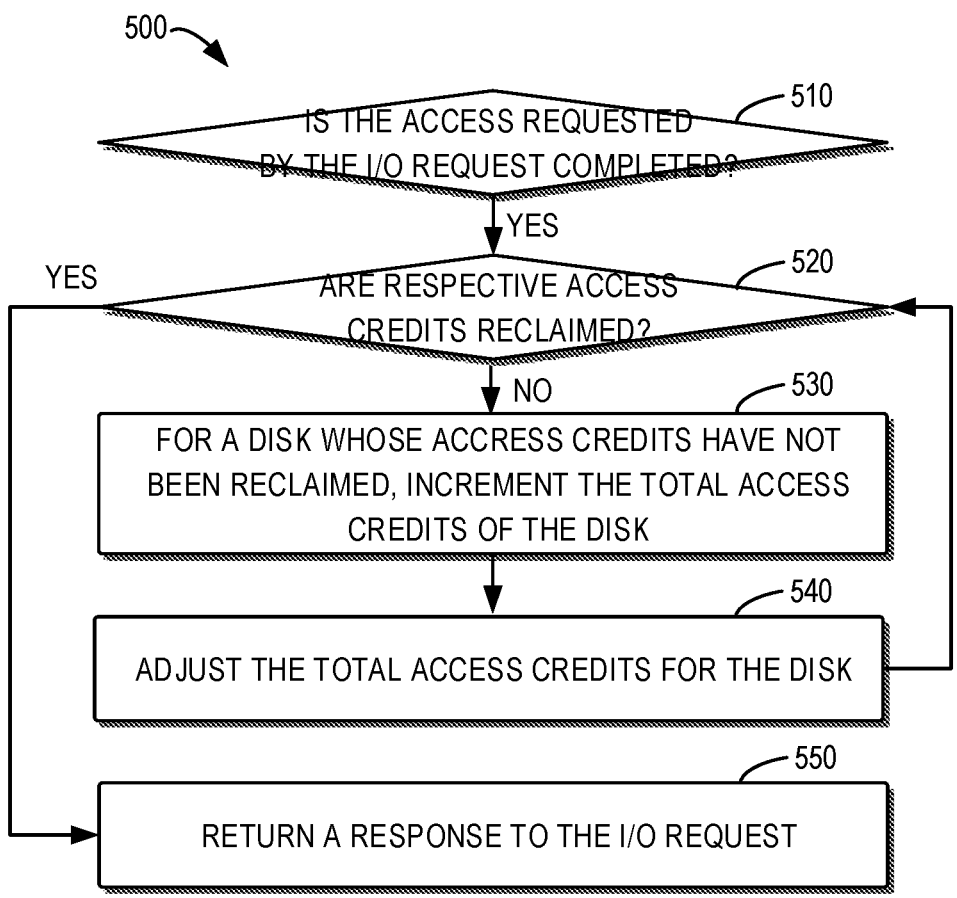
FIG. 5 illustrates a flowchart of an example method for reclaiming an access credit allocated for the I/O request in accordance with embodiments of the present disclosure.

In some embodiments, when respective access requested by the I/O request is completed, the corresponding access credits for the I/O request can be reclaimed. FIG. 5 illustrates a flowchart of a method 500 for reclaiming an access credit allocated for the I/O request in accordance with embodiments of the present disclosure. The method 500, for example, can be executed subsequent to the block 240 shown in FIG. 2. It is to be understood that the method 500 can include additional actions not shown and/or omit the illustrated actions. The scope of the present disclosure is not limited in this regard.

At block 510, the storage manager 120 determines whether the access requested by the I/O request is completed. If it is completed, the storage manager 120 determines, at block 520, whether the corresponding access credits allocated to the at least one disk has been reclaimed.

If there are a disk whose access credits have not been reclaimed, the storage manager 120 may increment the total access credits of the disk at block 530. In some embodiments, for the read request, the storage manager 120 may increment the number of the hybrid access credits and the number of the read access credits of this disk. Alternatively, for the write request, the storage manager 120 may increment the number of the hybrid access credits and the number of the write access credits of this disk.

The storage manager 120 may adjust the access credits for the disk at block 540. Through dynamically adjusting the access credits of the disk based on the disk performance, embodiments of the present disclosure can adapt to performance degradation due to disk wear and can balance differences among different disks of the same type caused by different manufacturers, so as to improve the overall access performance of the storage device.

Figure 6:
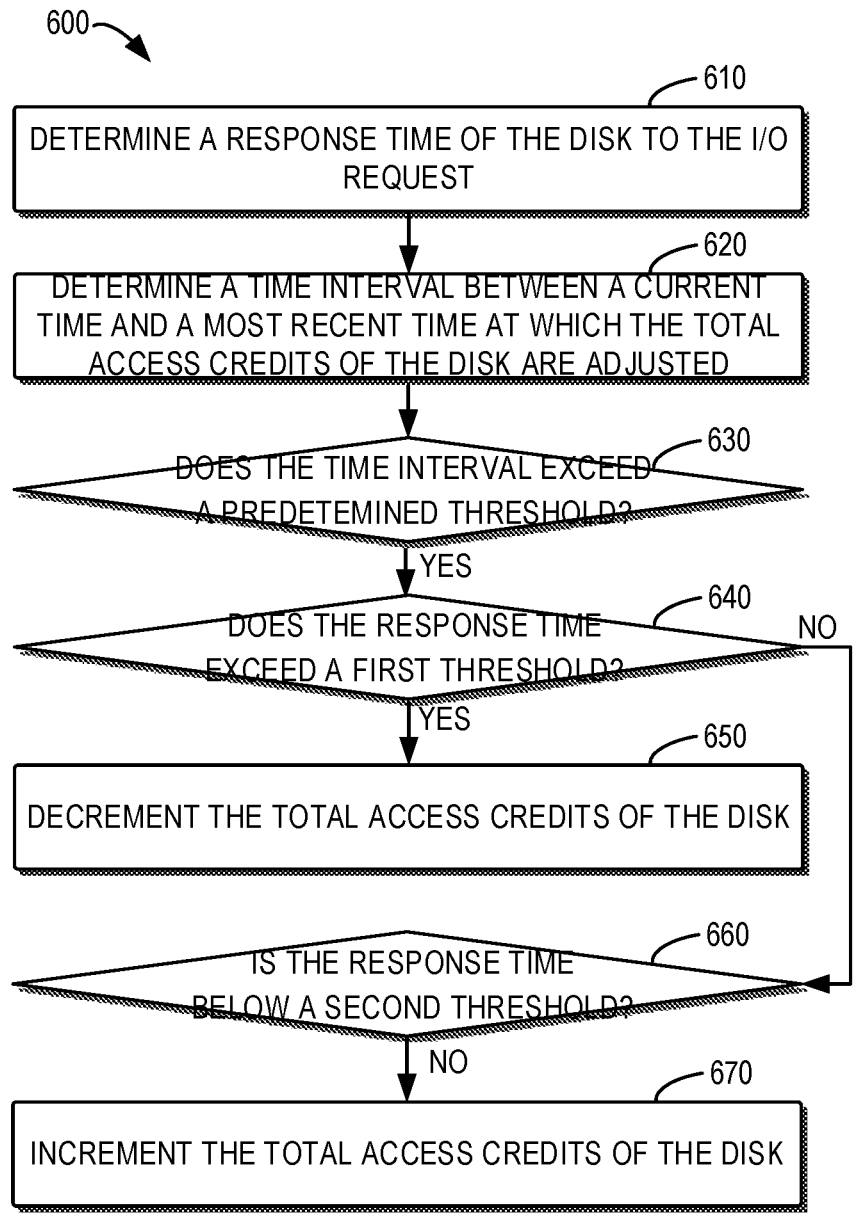
FIG. 6 illustrates a flowchart of an example method for dynamically adjusting the access credits of the disk in accordance with embodiments of the present disclosure.

FIG. 6 illustrates a flowchart of a method 600 for dynamically adjusting the access credits of the disk based on the performance of the disk in accordance with embodiments of the present disclosure. The method 600 can act as an example implementation of the block 540 as shown in FIG. 5. It is to be understood that the method 600 also can include additional actions not shown and/or omit the illustrated actions, and the scope of the present disclosure is not limited in this regard.

At block 610, the storage manager 120 may determine a response time of the disk to the I/O request. In some embodiments, regarding a read request, the storage manager 120 can record a start time of the read operation before initiating the read operation on the disk. When the requested data is read from the disk, the storage manager 120 can record a finish time of the read operation. The storage manager 120 can determine, based on a difference between the start time and the finish time, a response time of the disk for the read request. Similarly, regarding a write request, the storage manager 120 can record a start time of the write operation before initiating the write operation on the disk. When the requested data is written into the disk, the storage manager 120 can record a finish time of the write operation.

The storage manager 120 can determine, based on a difference between the start time and the finish time, a response time of the disk for the write request.

At block 620, the storage manager 120 may determine a time interval between a current time and a most recent time at which the access credits for the disk are adjusted. At block 630, the storage manager 120 may compare the time interval with a predetermined threshold. If the time interval exceeds the predetermined threshold, the storage manager 120 can adjust the access credits; otherwise, the storage manager 120 may not adjust the access credits. In this way, embodiments of the present disclosure can avoid a sudden change of the access credits of the disk within a short time period. In some embodiments, for example, the predetermined threshold for comparison with the time interval can be set to 1 minute.

If the time interval exceeds the predetermined threshold, at block 640, the storage manager 120 may determine whether a response time of the disk for the I/O request exceeds a first threshold (such as, 1000 ms). If the response time exceeds the first threshold, at block 650, the storage manager 120 may decrement the total access credits of the disk. For example, if the I/O request is a read request, the storage manager 120 may decrement the number of the hybrid access credits and the number of the read access credits of the disk. Alternatively, if the I/O request is a write request, the storage manager 120 may decrement the number of the hybrid access credits and the number of the write access credits of the disk. If the response time fails to exceed the first threshold, at block 660, the storage manager 120 may determine whether the response time of the disk for the I/O request is below a second threshold (e.g., 1 us). If the response time is below the second threshold, at block 670, the storage manager 120 may decrement the total access credits of the disk. For example, if the I/O request is a read request, the storage manager 120 may decrement the number of the hybrid access credits and the number of the read access credits of the disk. Alternatively, if the I/O request is a write request, the storage manger 120 may decrement the number of the hybrid access credits and the number of the write access credits of the disk.

Return to FIG. 5, the method 500 proceeds to block 520, at which the storage manager 120 determines whether the respective access credits allocated to the at least one disk are reclaimed. If the respective access credits allocated to the at least one disk are reclaimed, the storage manager 120 may return, to the host 110, a response to the I/O request at block 550.

Additionally or alternatively, in some embodiments, for example, after the method 500 is performed, the storage manager 120 may further determine whether there is an I/O request waiting to be processed in the waiting queue (e.g., the I/O request whose processing is suspended due to unavailability of the required access credits). If there is such an I/O request, the storage manager 120 may perform the method 200 as shown in FIG. 2, so as to process the I/O request.

It can be seen from the above description that embodiments of the present disclosure allocate different access credits to different types of disks, so as to make full use of the resources of the disks with high performance. Furthermore, embodiments of the present disclosure separate the read access credits from the write access credits for the same disk, so as to take full advantage of the short completion time of the read access. Embodiments of the present disclosure also dynamically adjust the access credits of the disk based on the response time of the disk for an input/output request, so as to adapt to performance degradation due to disk wear and balance differences among different disks of the same type due to different manufacturers. In this way, embodiments of the present disclosure can improve the overall access performance of the storage device.

Example implementations of the method in accordance with the present disclosure have been described above in details with reference to FIGS. 1 to 6. Implementations of a corresponding apparatus will be described in the following text.

In some embodiments, there is provided an apparatus of managing a storage device. The apparatus includes: a first determining module configured to in response to receiving an I/O request for a storage device including a plurality of disks, determine, from the plurality of disks, at least one disk related to the I/O request; an allocating module configured to allocate, to each of the at least one disk, at least one access credit for completing the I/O request from total access credits of the disk, wherein the total access credits are associated with at least one of a type of the disk, a type of the I/O request and performance of the disk; and an access performing module configured to in response to respective access credits being allocated to the at least one disk, perform access requested by the I/O request to each of the at least one disk.

In some embodiments, the allocating module includes: a first determining unit configured to determine, based on the type of the I/O request, the total access credits of the disk; a second determining unit configured to determine whether the total access credits are sufficient for completing the I/O request; and an allocating unit configured to in response to the total access credits being sufficient for completing the I/O request, allocate the at least one access credit from the total access credits.

In some embodiments, the first determining unit is further configured to: in response to the I/O request being a read request, determine the total access credits as read access credits for read requests, wherein the read access credits indicate a maximum number of read requests which can be processed by the disk simultaneously; and in response to the I/O request being a write request, determine the total access credits as write access credits for write requests, wherein the write access credits indicate a maximum number of write requests which can be processed by the disk simultaneously.

In some embodiments, the first determining unit is also configured to: determine the total access credits as hybrid access credits for read requests or write requests, wherein the hybrid access credits indicate a maximum value of a total number of read requests and write requests which can be processed by the disk simultaneously.

In some embodiments, the apparatus also includes: a first reclaiming module configured to in response to the at least one access credit failing to be allocated to one of the at least one disk, reclaim access credits having been allocated for the I/O request; and a waiting module configured to suspend allocation of access credits for the I/O request until an access credit allocated for a previous I/O request directed to the storage device is reclaimed.

In some embodiments, the apparatus also includes a second reclaiming module configured to in response to respective access to the at least one disk being completed, reclaim the respective access credits allocated to the at least one disk for a subsequent I/O request.

In some embodiments, the apparatus also includes: a second determining module configured to determine a response time of the disk to the I/O request; a third determining module configured to determine a time interval between a current time and a most recent time at which the total access credits of the disk are adjusted; and an adjusting module configured to in response to the time interval exceeding a predetermined threshold, adjust the total access credits of the disk based on the response time.

In some embodiments, the adjusting module is also configured to: in response to the response time exceeding a first threshold, decrease the total access credits of the disk; and in response to the response time being lower a second threshold, increase the total access credits of the disk, wherein the first threshold exceeds the second threshold.

In some embodiments, the initial number of the total access credits of the disk is associated with a type of the disk, and the initial number of total access credits of a disk having a first type associated with higher performance exceeds the initial number of total access credits of a disk having a second type associated with lower performance.

In some embodiments, the initial number of the read access credits exceeds that of the write access credits.

In some embodiments, the storage device is a Redundant Array of Independent Disks (RAID).

Figure 7:
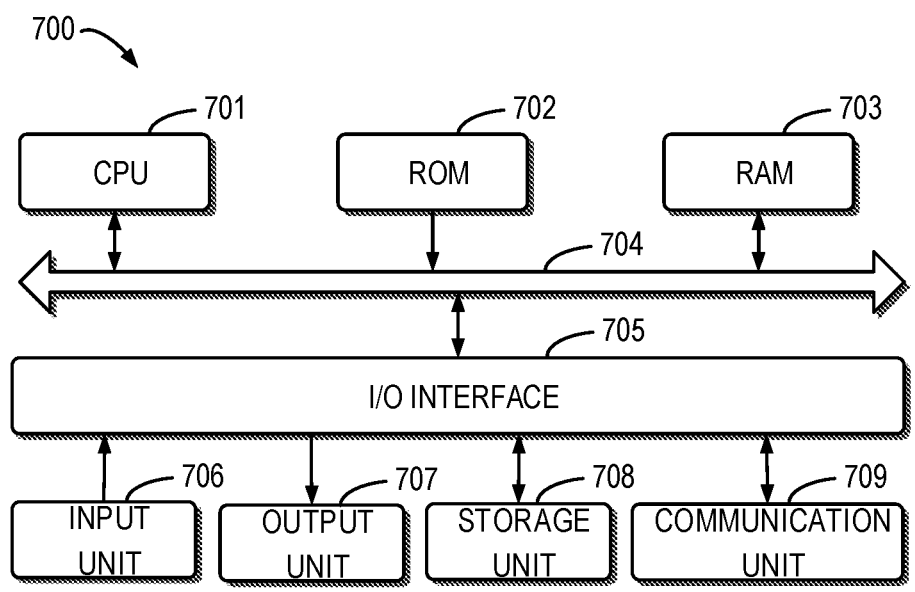
FIG. 7 illustrates a schematic block diagram of an example device for implementing embodiments of the present disclosure.

FIG. 7 illustrates a schematic block diagram of an example device 700 for implementing embodiments of the present disclosure. For example, the storage manager 120 shown in FIG. 1 can be implemented by the device 700. As shown, the device 700 includes a central processing unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operations of the device 700. CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 706, such as keyboard, mouse and the like; an output unit 707, e.g., various kinds of display and loudspeakers etc.; a storage unit 708, such as disk and optical disk etc.; and a communication unit 709, such as network card, modem, wireless transceiver and the like. The communication unit 709 allows the device 700 to exchange information/data with other devices via the computer network, such as Internet, and/or various telecommunication networks.

The above described each procedure and processing, such as methods 200, 400, 500 and/or 600, can be executed by the processing unit 701. For example, in some embodiments, the methods 200, 400, 500 and/or 600 can be implemented as a computer software program tangibly included in the machine-readable medium, e.g., storage unit 708. In some embodiments, the computer program can be partially or fully loaded and/or mounted to the device 700 via ROM 702 and/or communication unit 709. When the computer program is loaded to RAM 703 and executed by the CPU 701, one or more steps of the above described methods 200, 400, 500 and/or 600 can be implemented.

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, such as Smalltalk, C++ and the like, and traditional procedural programming languages, e.g., "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Flowcharts and/or block diagrams of method, apparatus (system) and computer program product in accordance with embodiments of the present disclosure describe various aspects of the present disclosure. It should be appreciated that each block of the flowcharts and/or block diagrams and the combination thereof can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only by way of example rather than exhaustive and is not limited to the embodiments of the present disclosure. Many modifications and alterations, without deviating from the scope and spirit of the explained various embodiments, are obvious for those skilled in the art. The selection of terms in the text aims to best explain principles and actual applications of each embodiment and technical improvements made in the market by each embodiment, or enable other ordinary skilled in the art to understand embodiments of the present disclosure.

We claim:

1. A method for managing a storage device, comprising:
   in response to receiving an I/O request for a storage device comprising a plurality of disks, determining, from the plurality of disks, at least one disk related to the I/O request;
   allocating, to each of the at least one disk, at least one access credit for completing the I/O request from total access credits of the disk, wherein the total access credits are associated with at least one of a type of the disk, a type of the I/O request and performance of the disk; and
   in response to respective access credits being allocated to the at least one disk, performing access requested by the I/O request to each of the at least one disk.

2. A method for managing a storage device, comprising:
   in response to receiving an I/O request for a storage device comprising a plurality of disks, determining, from the plurality of disks, at least one disk related to the I/O request;
   allocating, to each of the at least one disk, at least one access credit for completing the I/O request from total access credits of the disk, wherein the total access credits are associated with at least one of a type of the disk, a type of the I/O request and performance of the disk; and
   in response to respective access credits being allocated to the at least one disk, performing access requested by the I/O request to each of the at least one disk;
   wherein allocating the at least one access credit comprises:
   determining, based on the type of the I/O request, the total access credits of the disk;
   determining whether the total access credits are sufficient for completing the I/O request; and
   in response to the total access credits being sufficient for completing the I/O request, allocating the at least one access credit from the total access credits.

3. The method of claim 2, wherein determining the total access credits comprises:
   in response to the I/O request being a read request, determining the total access credits as read access credits for read requests, wherein the read access credits indicate a maximum number of read requests which can be processed by the disk simultaneously; and
   in response to the I/O request being a write request, determining the total access credits as write access credits for write requests, wherein the write access credits indicate a maximum number of write requests which can be processed by the disk simultaneously.

4. The method of claim 2, wherein determining the total access credits comprises:
   determining the total access credits as hybrid access credits for read requests or write requests, wherein the hybrid access credits indicate a maximum value of a total number of read requests and write requests which can be processed by the disk simultaneously.

5. The method of claim 1, further comprising:
   in response to the at least one access credit failing to be allocated to one of the at least one disk, reclaiming access credits having been allocated for the I/O request; and
   suspending allocation of access credits for the I/O request until an access credit allocated for a previous I/O request directed to the storage device is reclaimed.

6. The method of claim 1, further comprising:
   in response to respective access to the at least one disk being completed, reclaiming the respective access credits allocated to the at least one disk for a subsequent I/O request.

7. The method of claim 1, further comprising:
   determining a response time of the disk to the I/O request;
   determining a time interval between a current time and a most recent time at which the total access credits of the disk are adjusted; and in response to the time interval exceeding a predetermined threshold, adjusting the total access credits of the disk based on the response time.

8. The method of claim 7, wherein adjusting the total access credits of the disk comprises:
in response to the response time exceeding a first threshold, decreasing the total access credits of the disk; and
in response to the response time being lower a second threshold, increasing the total access credits of the disk, wherein the first threshold exceeds the second threshold.

9. The method of claim 1, wherein the initial number of the total access credits of the disk is associated with a type of the disk, and wherein the initial number of total access credits of a disk having a first type associated with higher performance exceeds the initial number of total access credits of a disk having a second type associated with lower performance.

10. The method of claim 3, wherein the initial number of the read access credits exceeds that of the write access credits.

11. The method of claim 1, wherein the storage device is a Redundant Array of Independent Disks (RAID).

12. An apparatus for managing a storage device, comprising:
at least one processing unit;
at least one memory coupled to the at least one processing unit and storing instructions for execution by the at least one processing unit, the instructions, when executed by the at least one processing unit, causing the apparatus to perform actions comprising:
in response to receiving an I/O request for a storage device comprising a plurality of disks, determining, from the plurality of disks, at least one disk related to the I/O request;
allocating, to each of the at least one disk, at least one access credit for completing the I/O request from total access credits of the disk, wherein the total access credits are associated with at least one of a type of the disk, a type of the I/O request and performance of the disk; and
in response to respective access credits being allocated to the at least one disk, performing access requested by the I/O request to each of the at least one disk.

13. An apparatus for managing a storage device, comprising:
at least one processing unit;
at least one memory coupled to the at least one processing unit and storing instructions for execution by the at least one processing unit, the instructions, when executed by the at least one processing unit, causing the apparatus to perform actions comprising:
in response to receiving an I/O request for a storage device comprising a plurality of disks, determining, from the plurality of disks, at least one disk related to the I/O request;
allocating, to each of the at least one disk, at least one access credit for completing the I/O request from total access credits of the disk, wherein the total access credits are associated with at least one of a type of the disk, a type of the I/O request and performance of the disk; and
in response to respective access credits being allocated to the at least one disk, performing access requested by the I/O request to each of the at least one disk;
wherein allocating the at least one access credit comprises:

determining, based on the type of the I/O request, the total access credits of the disk;
determining whether the total access credits are sufficient for completing the I/O request; and
in response to the total access credits being sufficient for completing the I/O request, allocating the at least one access credit from the total access credits.

14. The apparatus of claim 13, wherein determining the total access credits comprises:
in response to the I/O request being a read request, determining the total access credits as read access credits for read requests, wherein the read access credits indicate a maximum number of read requests which can be processed by the disk simultaneously; and
in response to the I/O request being a write request, determining the total access credits as write access credits for write requests, wherein the write access credits indicate a maximum number of write requests which can be processed by the disk simultaneously.

15. The apparatus of claim 13, wherein determining the total access credits comprises:
determining the total access credits as hybrid access credits for read requests or write requests, wherein the hybrid access credits indicate a maximum value of a total number of read requests and write requests which can be processed by the disk simultaneously.

16. The apparatus of claim 12, wherein the actions further comprise:
in response to the at least one access credit failing to be allocated to one of the at least one disk, reclaiming access credits having been allocated for the I/O request; and
suspending allocation of access credits for the I/O request until an access credit allocated for a previous I/O request directed to the storage device is reclaimed.

17. The apparatus of claim 12, wherein the actions further comprise:
in response to respective access to the at least one disk being completed, reclaiming the respective access credits allocated to the at least one disk for a subsequent I/O request.

18. The apparatus of claim 12, wherein the actions further comprise:
determining a response time of the disk to the I/O request;
determining a time interval between a current time and a most recent time at which the total access credits of the disk are adjusted; and
in response to the time interval exceeding a predetermined threshold, adjusting the total access credits of the disk based on the response time.

19. The apparatus of claim 18, wherein adjusting the total access credits of the disk comprises:
in response to the response time exceeding a first threshold, decreasing the total access credits of the disk; and
in response to the response time being lower a second threshold, increasing the total access credits of the disk, wherein the first threshold exceeds the second threshold.

20. The apparatus of claim 12, wherein the initial number of the total access credits of the disk is associated with a type of the disk, and wherein the initial number of total access credits of a disk having a first type associated with higher performance exceeds the initial number of total access credits of a disk having a second type associated with lower performance.

21. The apparatus of claim 14, wherein the initial number of the read access credits exceeds that of the write access credits.

22. The apparatus of claim 12, wherein the storage device is a Redundant Array of Independent Disks (RAID).

23. A computer program product having a non-transitory computer readable medium which stores a set of instructions to manage a storage device; the set of instructions, when carried out by computerized circuitry, causing the computerized circuitry to perform a method of:
   in response to receiving an I/O request for a storage device comprising a plurality of disks, determining, from the plurality of disks, at least one disk related to the I/O request;
   allocating, to each of the at least one disk, at least one access credit for completing the I/O request from total access credits of the disk, wherein the total access credits are associated with at least one of a type of the disk, a type of the I/O request and performance of the disk; and
   in response to respective access credits being allocated to the at least one disk, performing access requested by the I/O request to each of the at least one disk;
   wherein allocating the at least one access credit comprises:
   determining, based on the type of the I/O request, the total access credits of the disk;
   determining whether the total access credits are sufficient for completing the I/O request; and
   in response to the total access credits being sufficient for completing the I/O request, allocating the at least one access credit from the total access credits.

24. The method of claim 1, wherein a Redundant Array of Independent Disks (RAID) stripe includes a first extent from a first disk and a second extent from a second disk; and
   wherein allocating includes:
      providing a first number of access credits to the first disk based on a type of the first disk and providing a second number of access credits to the second disk based on a type of the second disk, the first number being different from the second number.

25. The method of claim 1, wherein performing the access requested by the I/O request includes:
   accessing each of the at least one disk after the respective access credits are allocated to prevent overload of the at least one disk.

* * * * *